(12) United States Patent
Lu et al.

(10) Patent No.: US 9,754,581 B2
(45) Date of Patent: Sep. 5, 2017

(54) REMINDER SETTING METHOD AND APPARATUS

(71) Applicant: TENCENT TECHNOLOGY (SHENZHEN) COMPANY LIMITED, Shenzhen, Guangdong (CN)

(72) Inventors: Li Lu, Shenzhen (CN); Feng Rao, Shenzhen (CN); Song Liu, Shenzhen (CN); Zongyao Tang, Shenzhen (CN); Xiang Zhang, Shenzhen (CN); Shuai Yue, Shenzhen (CN); Bo Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 595 days.

(21) Appl. No.: 13/903,593

(22) Filed: May 28, 2013

(65) Prior Publication Data
US 2014/0324426 A1    Oct. 30, 2014

Related U.S. Application Data

(63) Continuation of application No. PCT/CN2013/075014, filed on Apr. 28, 2013.

(51) Int. Cl.
*G10L 15/00* (2013.01)
*G06Q 50/00* (2012.01)
(Continued)

(52) U.S. Cl.
CPC .......... *G10L 15/08* (2013.01); *G06Q 10/1097* (2013.01); *G10L 15/26* (2013.01); *G10L 2015/088* (2013.01)

(58) Field of Classification Search
CPC .................................................... G06Q 10/10
(Continued)

(56) References Cited

U.S. PATENT DOCUMENTS

| 5,612,869 A * | 3/1997 | Letzt | G06Q 10/10 |
| | | | 704/251 |
| 9,099,089 B2 * | 8/2015 | Dzik | G10L 15/26 |

(Continued)

FOREIGN PATENT DOCUMENTS

| CN | 1581951 A | 2/2005 |
| CN | 101957202 A | 1/2011 |
| CN | 102207845 A | 10/2011 |

OTHER PUBLICATIONS

Jan. 23, 2014 Search Report issued in International Patent Application No. PCT/CN2013/075014.
(Continued)

*Primary Examiner* — David Hudspeth
*Assistant Examiner* — Timothy Nguyen
(74) *Attorney, Agent, or Firm* — Morgan, Lewis & Bockius LLP

(57) ABSTRACT

The present invention, pertaining to the field of speech recognition, discloses a reminder setting method and apparatus. The method includes: acquiring speech signals; acquiring time information in speech signals by using keyword recognition, and determining reminder time for reminder setting according to the time information; acquiring text sequence corresponding to the speech signals by using continuous speech recognition, and determining reminder content for reminder setting according to the time information and the text sequence; and setting a reminder according to the reminder time and the reminder content. According to the present invention, acquiring time information in speech signals by using keyword recognition ensures correctness of time information extraction, and achieves an (Continued)

effect that correct time information is still acquired by keyword recognition to set a reminder even in the case that a recognized text sequence is incorrect due to poor precision in whole text recognition in the speech recognition.

15 Claims, 10 Drawing Sheets

(51) Int. Cl.
G10L 15/08 (2006.01)
G10L 15/26 (2006.01)
G06Q 10/10 (2012.01)

(58) Field of Classification Search
USPC .......................................................... 704/242
See application file for complete search history.

(56) References Cited

U.S. PATENT DOCUMENTS

| | | | |
|---|---|---|---|
| 2002/0120447 A1* | 8/2002 | Charlesworth | G10L 15/06 704/254 |
| 2003/0028375 A1* | 2/2003 | Kellner | G10L 15/22 704/235 |
| 2005/0080631 A1 | 4/2005 | Abe et al. | |
| 2006/0200743 A1* | 9/2006 | Thong | G11B 27/10 715/203 |
| 2009/0276216 A1* | 11/2009 | Amini | G10L 15/02 704/236 |
| 2010/0318398 A1* | 12/2010 | Brun | G06F 17/2775 705/7.18 |
| 2011/0295605 A1* | 12/2011 | Lin | G10L 15/08 704/251 |
| 2012/0265535 A1* | 10/2012 | Bryant-Rich | H04M 1/7255 704/270 |
| 2013/0204622 A1* | 8/2013 | Lu | G06F 3/167 704/251 |

OTHER PUBLICATIONS

Jan. 23, 2014 Written Opinion issued in International Patent Application No. PCT/CN2013/075014.

Sep. 11, 2015 Office Action issued in Chinese Patent Application No. 201310157869.2.

* cited by examiner

REMINDER SETTING METHOD AND APPARATUS

CROSS-REFERENCE TO RELATED APPLICATIONS

This application is a continuation of International Application No. PCT/CN2013/075014, filed on 28 Apr. 2013. The entire disclosures of the above application are incorporated herein by reference.

FIELD OF THE INVENTION

The present invention relates to the field of speech recognition, and in particular, to a reminder setting method and apparatus.

BACKGROUND OF THE INVENTION

With rapid development of the speech recognition technology and mobile Internet, more and more speech input-based application programs have been provided on electronic devices such as mobile phones, tablet computers, smart TVs. Such speech input-based application programs provide services according to speech signals input by users.

Investigation from users within a specific range shows that when users use speech input-based application programs, the three functions that are used most frequently are: setting a reminder by using speech input, querying weather by using speech input, and determining geographical location user by using speech input.

Using setting a reminder by using speech input by a user on a smartphone as an example, the current reminder setting method includes the following steps: Firstly, the smartphone collects a speech signal input by the user, where the speech signal is used to set a reminder corresponding to a reminder time point, and for example, the speech signal may be "wake me up at 8 o'clock tomorrow morning"; after the smartphone forwards the speech signal to a server, the server processes the speech signal by using "continuous speech signal" and "semantic analysis", i.e., the server firstly recognizes all the speech signals to a corresponding text sequence by using continuous speech recognition, then extracts time information "8 o'clock tomorrow morning" and reminder content "wake me up" from the text sequence by using semantic analysis, and feeds back the extraction result to the smartphone; finally, the smartphone sets the corresponding reminder according to the time information "8 o'clock tomorrow morning" and the reminder content "wake me up".

During the implementation of the present invention, the inventors find that the prior art has at least the following problems:

First, during the process of recognizing by the server all the speech signals to the corresponding text sequence, the accuracy in whole-text recognition is not stable. For example, in the case of severe ambient noise, the accuracy is obviously reduced. Still for example, since the basic decoding principle of the continuous speech recognition is to seek an optimal global solution, if the initial part of the speech signal is incorrectly recognized, the probability that the subsequent part of the speech signal is incorrectly recognized is very high.

Second, during the processing of extracting by the server the time information and the reminder content from the recognized text sequence, generally the text sequence is matched based on a template, the time information is extracted according to the time region in the matching result, and the reminder content is extracted according to the event region in the matching result. During specific implementation, various possible text sequence templates need to be collected in advance. Due to restriction in the template collection, the finally collected text sequence templates may fail to cover all possible text sequence forms. As a result, even if the speech signal is correctly recognized to the corresponding text sequence, a reminder may fail to be set or is set incorrectly because the time information may still fail to be extracted due to incomplete matching of the text sequence templates.

SUMMARY OF THE INVENTION

The technical solutions are as follows:

In a first aspect, a reminder setting method is provided, where the method includes:

acquiring a speech signal;

acquiring time information in the speech signal by using keyword recognition;

determining a reminder time for reminder setting according to the time information;

acquiring a text sequence corresponding to the speech signal by using continuous speech recognition;

determining reminder content for reminder setting according to the time information and the text sequence; and setting a reminder according to the reminder time and the reminder content.

In a second aspect, a reminder setting apparatus is provided, where the apparatus includes:

a speech acquiring module, configured to acquire a speech signal;

a first recognizing module, configured to acquire, by using keyword recognition, time information in the speech signal acquired by the speech acquiring module;

a time determining module, configured to determine a reminder time for reminder setting according to the time information acquired by the first recognizing module; a second recognizing module, configured to acquire, by using continuous speech recognition, a text sequence corresponding to the speech signal acquired by the speech acquiring module;

a content determining module, configured to determine reminder content according to the time information acquired by the first recognizing module and the text sequence acquired by the second recognizing module; and a reminder setting module, configured to set a reminder according to the reminder time determined by the time determining module and the reminder content determined by the content determining module.

In a third aspect, computer readable storage medium storing one or more programs, which, when executed by a processor, performs the steps of:

acquiring a speech signal;

acquiring time information in the speech signal by using keyword recognition, and determining a reminder time for reminder setting according to the time information;

acquiring a text sequence corresponding to the speech signal by using continuous speech recognition, and determining reminder content for reminder setting according to the time information and the text sequence; and setting a reminder according to the reminder time and the reminder content.

BRIEF DESCRIPTION OF THE DRAWINGS

For a better understanding of the technical solutions in the embodiments of the present invention, the accompanying drawings for illustrating the embodiments are briefly described below. Apparently, the accompanying drawings in the following description illustrate only some embodiments of the present invention, and a person skilled in the art can derive other accompanying drawings from these accompanying drawings without any creative efforts.

DETAILED DESCRIPTION OF THE EMBODIMENTS

To make the technical solutions, and merits of the present invention clearer, the following describes the embodiments of the present invention in detail below with reference to the accompanying drawings.

Figure 1:
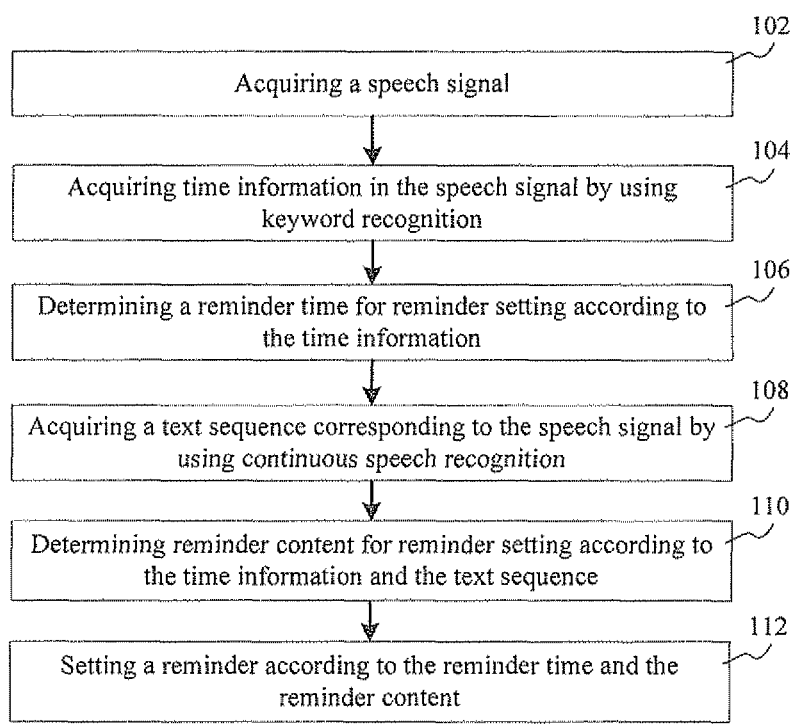
FIG. 1 is a flowchart of a reminder setting method according to an embodiment of the present invention.

Through research, the inventors have found that time information is more important than reminder content for reminder setting by using speech input. For example, assume that a speech signal is "Please remind me to take my temperature at 3 o'clock tomorrow afternoon", if the time information is recognized incorrectly, the recognized text sequence might be "Please remind me to take my temperature at tree or clock tomorrow afternoon", and consequently the setting of the reminder fails; however, if only the reminder content is recognized incorrectly, the recognized text sequence might be "Please remind me to Tibet at 3 o'clock tomorrow afternoon", and in this case, the reminder will still be set successfully. To be specific, even if the reminder reminds the user to "Tibet" at 3 o'clock tomorrow afternoon, the user would acquire the correct reminder content "take temperature" according to the homophones acquired incorrectly. Therefore, accuracy in recognition of time information needs to be ensured in the course of setting a reminder based on speech input. In view of this, the embodiments of the present invention provide two paths of parallel speech recognition. One path of speech recognition is keyword recognition directed to recognition of time information, and the other is continuous speech recognition directed to recognition of the entire speech signal and conversion of the speech signal into a text sequence. The details are given as follows:

Referring to FIG. 1, a flowchart of a reminder setting method according to an embodiment of the present invention is illustrated. The reminder setting method may be applied in an electronic device providing the function of setting a reminder based on speech input. The electronic device may be a terminal such as a smartphone, a smart TV, a tablet computer, or an e-book device. The reminder setting method may also be applied in a server. The server belongs to an electronic system providing the function of setting a reminder based on speech input. The electronic system includes not only a server but also at least one terminal. The reminder setting method includes:

Step 102: acquiring a speech signal.

The speech signal is input by a user for setting a reminder, which can be collected by a microphone, or may be sent to a server after being collected by using the microphone.

Step 104: acquiring time information in the speech signal by using keyword recognition.

The keyword recognition is a speech recognition technology for recognizing a keyword from continuous speech stream. In this embodiment, the keywords are time-specific keywords, for example, year, month, day, hour, minute, second, evening, early morning, morning, afternoon, tomorrow, and the like.

The time information in the speech signal acquired in step 102 is acquired by using keyword recognition, where the time information is recognized according to a time-specific speech segment in the speech signal and represented in text form. The time information includes a time-specific keyword, and start and end times of the time-specific keyword in the speech signal.

Step 106: determining a reminder time for reminder setting according to the time information.

The reminder time is a time for triggering a reminder. To be specific, when the reminder time arrives, i.e., the current time is the reminder time, the reminder is triggered.

Step 108: acquiring a text sequence corresponding to the speech signal by using continuous speech recognition.

The continuous speech recognition is a speech recognition technology for recognizing a continuous text sequence from a continuous speech stream.

The text sequence corresponding to the speech signal acquired in step 102 is acquired by using continuous speech recognition. The text sequence is a sequence recognized according to all speech segments in the speech signal and including at least one text. The text sequence includes at least one text and the start time and the end time of each text in the speech signal.

Step 110: determining reminder content for reminder setting according to the time information and the text sequence.

The reminder content includes content information and/or the speech segment corresponding to the content information in the speech signal, where the content information is a subset of the part not corresponding to the time information in the text sequence.

It should be noted that step 108 may be performed before or after step 104. Alternatively, step 108 and step 104 may be performed simultaneously.

Step 112: setting a reminder according to the reminder time and the reminder content.

In conclusion, according to the reminder setting method provided in this embodiment, acquiring time information in a speech signal by using keyword recognition ensures correctness of time information extraction, prevents the problem that a reminder fails to be set or is set incorrectly because time information is incorrectly extracted, and achieves an effect that correct time information is still acquired by keyword recognition to set a reminder even in the case that a recognized text sequence is incorrect due to a poor precision in whole text recognition in the speech recognition.

Figure 2A:
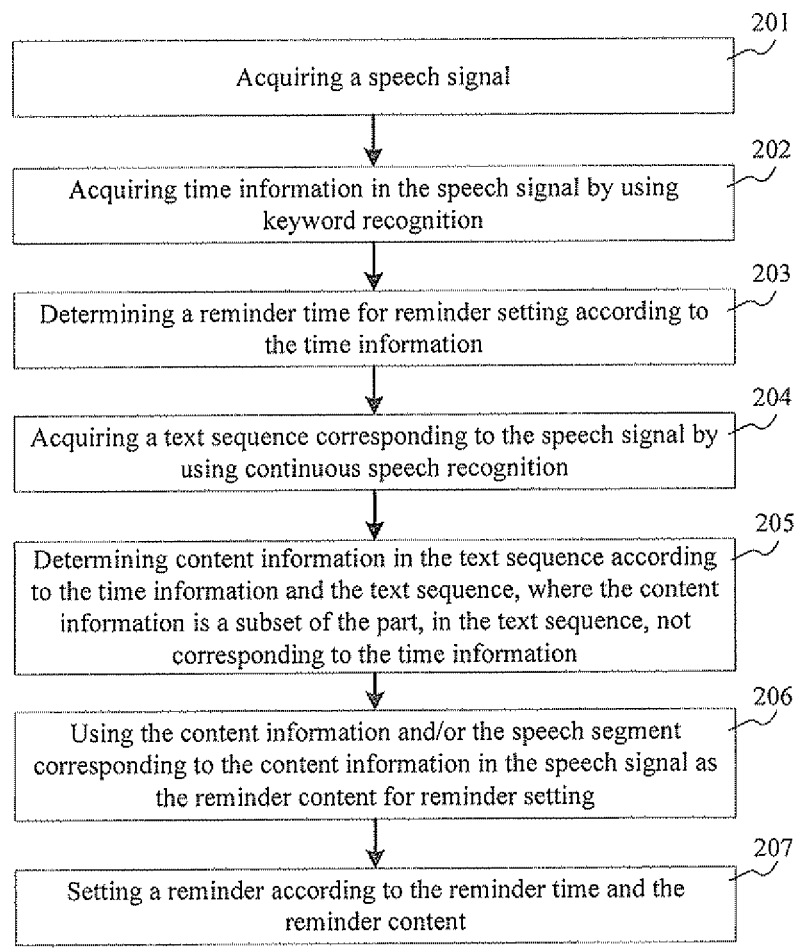
FIG. 2A is a flowchart of a reminder setting method according to another embodiment of the present invention.

Referring to FIG. 2A, a flowchart of a reminder setting method according to another embodiment of the present invention is illustrated. This embodiment uses applying the reminder setting method in an electronic device and uses a tablet computer as the electronic device as examples for description. In this embodiment, the electronic device is specifically a tablet computer. The reminder setting method includes:

Step 201: acquiring a speech signal.

A tablet computer runs an application program providing the function of setting a reminder based on speech input. After the application program detects a preset trigger signal, the tablet computer is triggered to collect the speech signal by using the microphone. The preset trigger signal includes at least one of a preset key signal, a preset voice control signal, a preset sensor signal, and a preset slide track signal.

For example, if the preset trigger signal is a "shake" signal, the application program detects, by using a sensor set inside the tablet computer, the "shake" signal, and the tablet computer acquires the speech signal by using a microphone. In this case, the tablet computer can collect the speech signal input by a user by using a built-in or external microphone.

In this embodiment, assume that the content of the speech signal acquired by the tablet computer is "Please attend the meeting in the meeting room at 3 o'clock tomorrow afternoon".

Step 202: acquiring time information in the speech signal by using keyword recognition.

The tablet computer acquires the time information in the speech signal by using keyword recognition, where the time information specifically includes a time-specific keyword, and start and end times of the time-specific keyword in the speech signal. Specifically, a tablet computer firstly inputs each of the segments in the speech signal into a keyword search network, where the keyword search network includes at least one foreground model and at least one background model. The time-specific keyword, and the start and end times of the time-specific keyword in the speech signal are acquired by matching the foreground model and the background model with each of the segments respectively. The time-specific keyword, and the start and end times of the time-specific keyword in the speech signal are used as the time information corresponding to the speech signal.

Figure 2B:
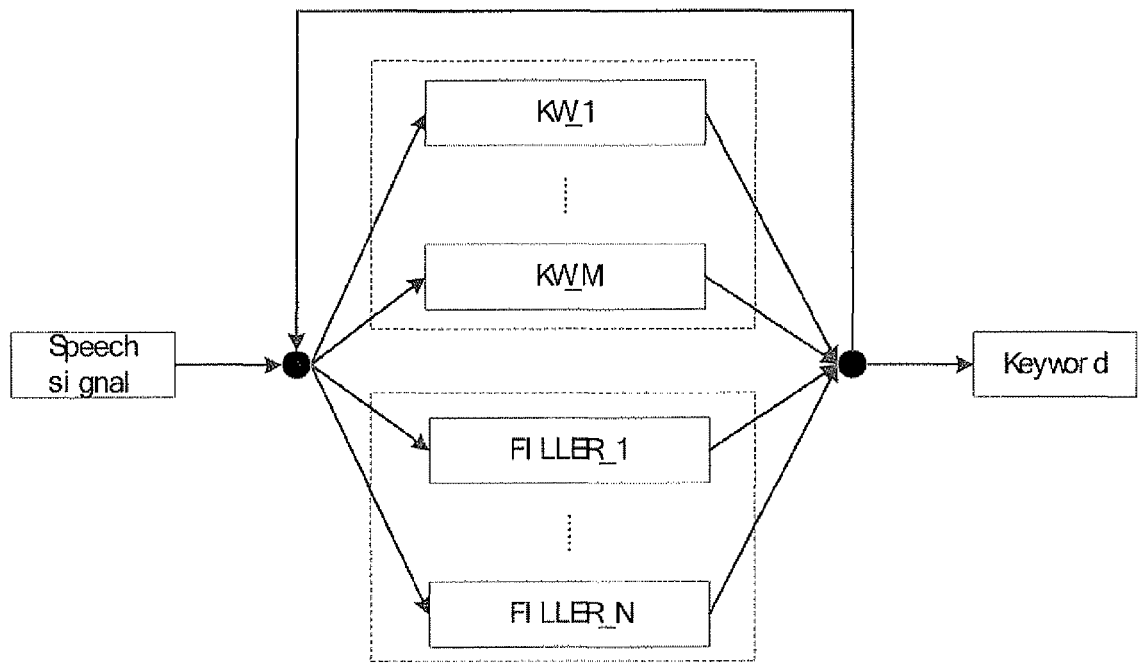
FIG. 2B is a schematic structural diagram of a keyword search network involved in embodiments of the present invention.

With reference to FIG. 2B, a schematic structural diagram of the keyword search network is illustrated. The keyword search network may include M foreground models Keyword (KW), and N background models Filler. The foreground model is used to recognize the time-specific keyword in the speech signal, and the background model is used to recognize the non-time-specific keyword in the speech signal, which facilitates differentiation from the time-specific keyword recognized by the foreground model. To be specific, each foreground model KW may correspond to a time-specific keyword, for example, year x, month x, day x, hour x, minute x, second x, x o'clock, date x, evening, early morning, morning, afternoon, tomorrow, and the like. The background model Filler corresponds to a non-time-specific keyword in the speech signal.

After each of the segments in the speech signal are input into the keyword search network, the segment corresponding to the time-specific keyword is recognized by the foreground model KW, and the segment corresponding to the non-time-specific keyword is recognized by the background model Filler. The non-time-specific keyword recognized by the background model can better differentiate the time-specific keyword recognized by the foreground model. The time-specific keyword in the speech signal, and the start and end times of the time-specific keyword in the speech signal can be acquired by confirming the keyword recognized by the foreground model KW.

For example, the tablet computer can input the speech signal "Please attend the meeting in the meeting room at 3 o'clock tomorrow afternoon" into the keyword search network to recognize the time-specific keyword "3 o'clock tomorrow afternoon", and the start and end times of the time-specific keyword "3 o'clock tomorrow afternoon" in the speech signal.

Figure 2C:
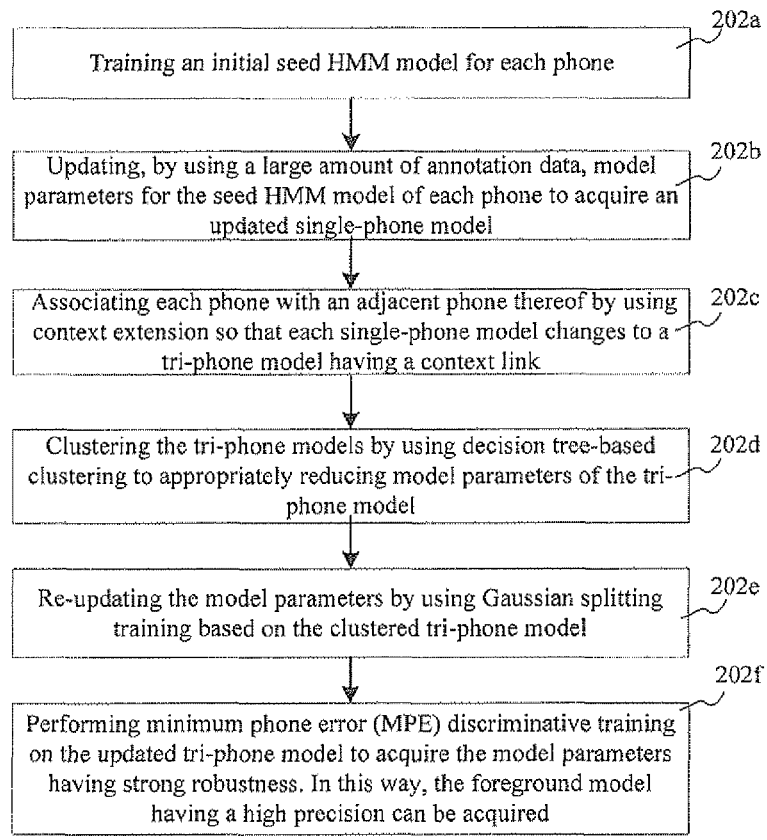
FIG. 2C is a flowchart of a foreground model training method involved in embodiments of the present invention.

The foreground model in the keyword search network may be a single-phone-based or tri-phone-based hidden Markov model (HMM). The phone is the minimum phonic unit, and the tri-phone is a modeling unit determined according to differences of context of a phone. The training of the foreground model may employ the training procedure of a single-phone-based or tri-phone-based HMM model. The procedure mainly includes the following steps, as illustrated in FIG. 2C:

202a: training an initial seed HMM model for each phone.

A phone is the minimum phonic unit, and in each language, several phones form a phone set, where the phone set may be acquired in advance. The topology of the HMM model is a common structure of an acoustic model, which is not described herein any further.

202b: updating, by using a large amount of annotation data, model parameters for the seed HMM model of each phone to acquire an updated single-phone model.

The annotation data is audio data prepared in advance. Word-level annotation data of audio data can be acquired by collecting the audio data of a language. In addition, audio features of the annotation data needs to be extracted. In this embodiment, the audio feature employs a perceptual linear predictive (PLP) feature. In other embodiments, audio features in other forms may also be used, which are not limited to the PLP feature.

202c: associating each phone with an adjacent phone thereof by using context extension so that each single-phone model changes to a tri-phone model having a context link.

202d: clustering the tri-phone models by using decision tree-based clustering to appropriately reducing model parameters of the tri-phone model.

202*e*: re-updating the model parameters by using Gaussian splitting training based on the clustered tri-phone model.

202*f*: performing minimum phone error (MPE) discriminative training on the updated tri-phone model to acquire the model parameters having strong robustness. In this way, the foreground model having a high precision can be acquired.

The background model in the keyword search network is not a common model trained by using a non-keyword. In this embodiment, the background model is a model acquired by clustering and subsequently training the phones in the foreground model based on phone confusion; or acquired by training using another language different from the language used by the foreground model. For example, the foreground model is a model acquired by training using Chinese Mandarin, and the background model is a model acquired by training using a language different from Chinese Mandarin but having similarity thereto, for example, Cantonese or Vietnamese. In the foreground and background models, phonic characters of some single phones may be ignored, so that a sharp contrast is formed against the formation of the keyword phone in the foreground model. This prevents as much as possible absorption of a keyword in the speech signal by the background model, and improves retrieval and recall rate of the keyword. The retrieval and recall rate includes a retrieval rate and a recall rate, which are both used to denote the retrieval performance of a keyword search network. The retrieval rate denotes the ratio of the number of correctly recognized keywords to the total number of reference keywords. The recall rate denotes a ratio of the number of correctly recognized keywords to the total number of reference keywords with regard to a specific query item.

Figure 2D:
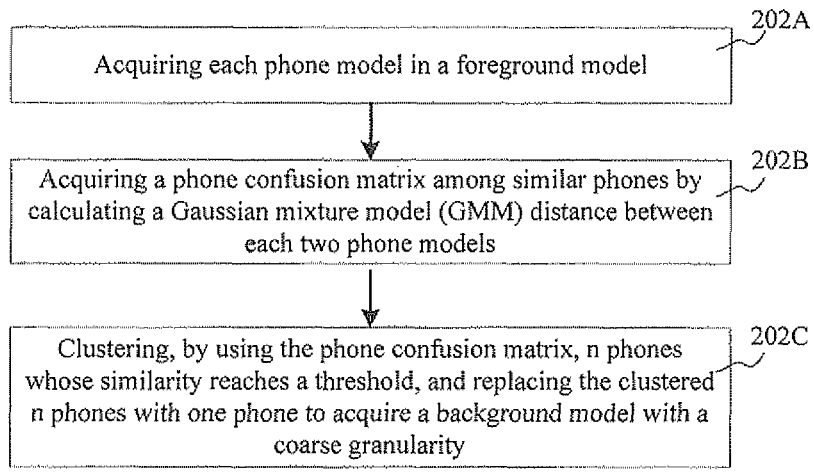
FIG. 2D is a flowchart of a background model training method involved in embodiments of the present invention.

When the background model is acquired by clustering the phones in the foreground model and subsequently training the clustered phones based on phone confusion, the training of the background model is as illustrated in FIG. 2D:

202A: acquiring each phone model in a foreground model.

During training of the foreground model, a phone model is trained based on single-phone or tri-phone. Therefore, a single-phone model or a tri-phone model corresponding to each phone can be acquired.

202B: acquiring a phone confusion matrix among similar phones by calculating a Gaussian mixture model (GMM) distance between each two phone models.

202C: clustering, by using the phone confusion matrix, n phones whose similarity reaches a threshold, and replacing the clustered n phones with one phone to acquire a background model with a coarse granularity.

For example, phones "b" and "d" are similar to each other, and phone "b" can be used to replace these two similar phones. Still for example, phones "z" and "zh" are similar to each other, and phone "z" can be used to replace these two similar phones.

Step 203: determining a reminder time for reminder setting according to the time information.

The tablet computer can determine the reminder time for reminder setting according to the time information acquired by keyword recognition.

Since the recognized time information may be in different formats, this step may further include the following sub-steps:

1) acquiring, by matching, a time information template corresponding to the time information from at least one preset time information template.

The tablet computer can match the recognized time information with at least one preset time information template, find a time information template whose time format and sememe are the same as or similar to the time information template, and use this time information template as the time information template corresponding to the time information. In this embodiment, the time information template is collected by using a text corpus containing a large amount of time information. During the process, all possible text corpuses of the time information are collected first; sequence characteristics of the text corpuses are analyzed and summarized; and finally the time information template is acquired according to the analysis result. For example, a common time information template is "date+clock", and the time information compliant with the template may be "8 o'clock tomorrow"; another common time information template is "month+date", and the time information compliant with the template may be "April 8".

It should be noted that, although a user may use various different colloquial speeches for the time information during speech input, collecting only time-specific templates consumes a much smaller workload as compared with the case, in the traditional semantic analysis technology, where templates need to be collected for all possible sentences (not limited to time only). In addition, the collected templates can basically cover all colloquial speeches of the users for the time information.

2) converting the time information into a standard time according to the time information template corresponding to the time information.

The tablet computer converts the time information into a standard time according to the matching result. The standard time is typically a time complaint with a specific standard time format. For example, if the time information template corresponding to the time information is "week+clock", and the standard time format is "year/month/day/hour/minute/second", and the current time is "2013/4/18/10:24:10", the tablet computer may convert the time information "8 o'clock next Wednesday" into a standard time "2013/4/24/8:00".

3) using the standard time as the reminder time for reminder setting.

Subsequently, the tablet computer uses the standard time as the reminder time for reminder setting, for example, using "2013/4/24/8:00" as the reminder point for reminder setting.

The recognized time information may not be complete sometimes. As a result, a plurality of future times may correspond to the recognized time information. For example, if the speech signal is "Please remind me to attend the meeting at 8 o'clock", the recognized time information is converted to a standard time "xxxx/xx/xx/8:00". In this case, a plurality of future times correspond thereto. Accordingly, this step may specifically include the following sub-steps:

1) The tablet computer detects whether there are two or more than two future times matching the standard time.

The tablet computer can detect whether there are two or more than two future times matching the standard time. For example, if the standard time is "xxxx/xx/xx/8:00" and the current time is 2013/04/19/07:01:19", then future times "2013/04/19/AM 08:00:00", "2013/04/19/PM 08:00:00", "2013/04/20/AM 08:00:00", and "2013/04/20/PM 08:00:00" match the standard time.

2) if it is detected that there are two or more than two future times matching the standard time, selecting from the two or more than two future times a time satisfying a first preset condition as the reminder time for reminder setting.

The first preset condition may be "closest to the current time". For example, the tablet computer may select the time "2013/04/19/AM 08:00", which is closest to the current time from two or more than two future times and use the selected time as the reminder time for reminder setting. In other embodiments, the first preset condition may also be "matching history setting rules", "corresponding to another speech input by the user" or the like. It should be still noted that there is generally one future time satisfying the first preset condition. However, there may be two or more than two future times satisfying the first preset condition. For example, during setting of a weekly reminder or a yearly reminder, there may be two or more than two future times satisfying the first preset condition.

With the above sub-steps, intelligent adjustment can be performed automatically on the time information when the time information is incomplete. Preferably, the tablet computer, during adjustment of the time information, may further interact with a user, to allow the user to select a more accurate time from all possible future times matching the time information.

Step 204: acquiring a text sequence corresponding to the speech signal by using continuous speech recognition.

The tablet acquires the text sequence corresponding to the speech signal by using continuous speech recognition. For example, the text sequence corresponding to the speech signal acquired by the tablet computer by using continuous speech recognition is "Please attend the meeting in the meeting room at tree or clock tomorrow afternoon".

Figure 2E:
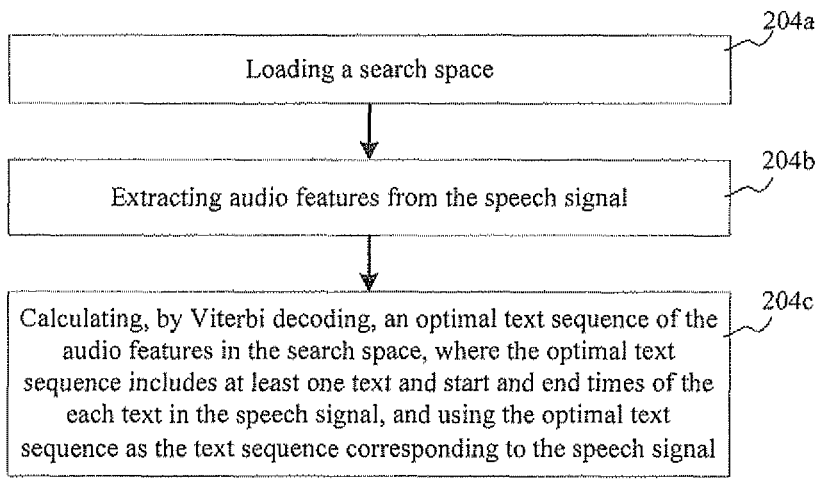
FIG. 2E is a flowchart of a continuous speech recognition process involved in embodiments of the present invention.

Specifically, the acquiring a text sequence corresponding to the speech signal by using continuous speech recognition includes the following sub-steps, as illustrated in FIG. 2E:

204*a*: loading a search space.

The search space includes an acoustic model, a lexicon, and a language model; where the acoustic model is a single-phone-based or tri-phone-based hidden Markov model, the lexicon includes a corresponding relationship between words and phones, and the language model includes a proportion relationship between words for combination into a text sequence.

The acoustic model in this step is an acoustic model the same as or similar to the above-described foreground model.

204*b*: extracting audio features from the speech signal.

Herein the audio feature still employs a PLP feature. A segment of speech signals may correspond to a segment of audio feature sequence.

204*c*: calculating, by Viterbi decoding, an optimal text sequence of the audio features in the search space, where the optimal text sequence includes at least one text, and start and end times of the each text in the speech signal, and using the optimal text sequence as the text sequence corresponding to the speech signal.

The Viterbi decoding is based on the following formula:

$$\hat{W} = \arg\max_W P(W|O) = \arg\max_W \frac{P(O|W)P(W)}{P(O)},$$

where O denotes an audio feature sequence; P(O|W) denotes a likelihood value from an acoustic model, which indicates a similarity between the audio feature of a speech signal and a text sequence W and can be acquired during training of the acoustic model; P(W) denotes a probability that the text sequence appears in text pairing, which can be generally determined by a context-related language model. According to the Bayesian decision theory, this sub-step is directed to finding an optimal text sequence $\hat{W}$, so that a posterior probability output from the above formula is maximum.

Based on the above sub-step, after the speech signal experiences continuous speech recognition, a corresponding text sequence is acquired. In addition, as seen from the above formula, while the corresponding text sequence W is acquired, a corresponding relationship between the text sequence W and the audio feature sequence O can also be acquired. Start and end times of each text in the text sequence in the speech signal can be acquired according to the corresponding relationship.

Step 205: determining content information in the text sequence according to the time information and the text sequence, where the content information is a subset of the part, in the text sequence, not corresponding to the time information.

Specifically, the time information includes a time-specific keyword, and start and end times of the time-specific keyword in the speech signal, and the text sequence includes at least one text, and start and end times of each text in the speech signal.

The tablet computer partitions, according to the start and end times of the time-specific keyword in the speech signal, and the start and end times of the each text in the speech signal, the text sequence into a part corresponding to the time information and a part not corresponding to the time information.

If the part not corresponding to the time information has one section, then the part not corresponding to the time information is used as the reminder content. For example, if the part corresponding to the time information is located in the beginning of the text sequence, then the part not corresponding to the time information has one section and is used as the reminder content.

If the part not corresponding to the time information has two or more than two sections, a section satisfying a second preset condition in the part not corresponding to the time information is used as the content information. For example, if the part corresponding to the time information is located in the middle of the text sequence, then the part not corresponding to the time information has two section, and one of the two sections satisfying a second preset condition is used as the content information.

The second preset condition may be "the longest". To be specific, the section satisfying the second preset condition in the part not corresponding to the time information may be a longest section in the part not corresponding to the time information having two or more than two sections.

It should be supplemented that the terms "corresponding" and "not corresponding" herein refer to a relationship in terms of time dimension.

Figure 2F:
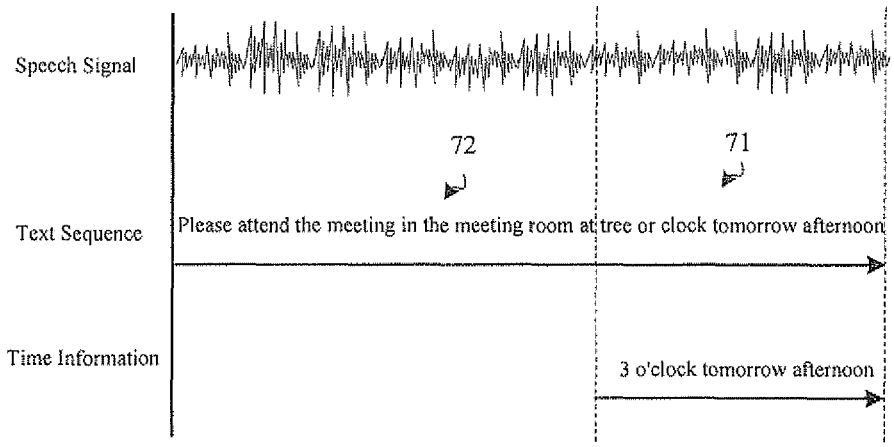
FIG. 2F is a schematic diagram of alignment of results of two paths of speech recognition according to the embodiment illustrated in FIG. 2A.

For example, after acquiring the time information output by keyword recognition and the text sequence output by continuous speech recognition, the tablet computer may align the two groups of results, the result is illustrated in FIG. 2F. The time information includes the time-specific keyword, and the start time and the end time of the time-specific keyword in the speech signal; the text sequence includes at least one text corresponding to the speech signal and the start time and the end time of each text in the speech signal.

Since no interference is caused by a language model to keyword recognition, the time information "3 o'clock tomorrow afternoon" is correctly recognized, whereas continuous speech recognition incorrectly recognizes "3 o'clock" as "tree or clock". However, according to the alignment result, the text sequence may be partitioned into a part 71 "tree or clock tomorrow afternoon" corresponding to the time information and a part 72 "please attend the meeting in the meeting room" not corresponding to the time information.

As illustrated in FIG. 2F, the part not corresponding to the time information has only one section, and therefore the part 72 not corresponding to the time information "attend the meeting in the meeting room at" is used as content information.

Step 206: using the content information and/or the speech segment corresponding to the content information in the speech signal as the reminder content for reminder setting.

The tablet computer uses the content information and/or the speech segment corresponding to the content information in the speech signal as the reminder content for reminder setting. The setting includes the following three cases:

The tablet computer uses the content information as the reminder content for reminder setting.

The tablet computer uses the speech segment corresponding to the content information in the speech signal as the reminder content for reminder setting.

The tablet computer uses the content information and/or the speech segment corresponding to the content information in the speech signal as the reminder content for reminder setting.

Step 207: setting a reminder according to the reminder time and the reminder content.

The tablet computer sets the reminder according to the reminder time and the reminder content. The reminder content may any or all of the content information and the speech segment corresponding to the content information in the speech signal. Herein, the case where both the content information and the speech segment corresponding to the content information in the speech signal are used as the reminder content for reminder setting is used an example for description. When the reminder time arrives, the tablet computer may either display on the screen thereof the content information "attend the meeting in the meeting room" in text form, or play over the loudspeaker thereof the speech segment corresponding to the content information in the speech signal "attend the meeting in the meeting room". Assuredly, the tablet computer may also display, as selected by the user, either the content information or the speech segment corresponding to the content information in the speech signal.

As compared with the previous embodiment, according to this embodiment, acquiring a background model by clustering and subsequently training the phones in the foreground model based on phone confusion, or acquiring a background model by training using another language different from the language used by the foreground model prevents as much as possible absorption of a keyword in the speech signal by the background model, and improves retrieval and recall rate of the keyword.

In addition, by comparison of results of two paths of speech recognition, the content information not corresponding to the time information in a text sequence is used as reminder content for reminder setting, so that even a text sequence acquired by continuous speech recognition is incorrect, reminder setting and running are not affected. In other words, even if the reminder content in this case contains incorrect content information, users will not miss the reminder. Furthermore, when the reminder content includes the speech segment corresponding to the content information in the speech signal, users can still acquire the correct reminder content by using their original speech signal, so that the function of setting a reminder by using speech input has a higher error-tolerance, thereby effectively reducing cases where users can correctly set a reminder only by repeatedly inputting a speech signal.

Figure 3A:
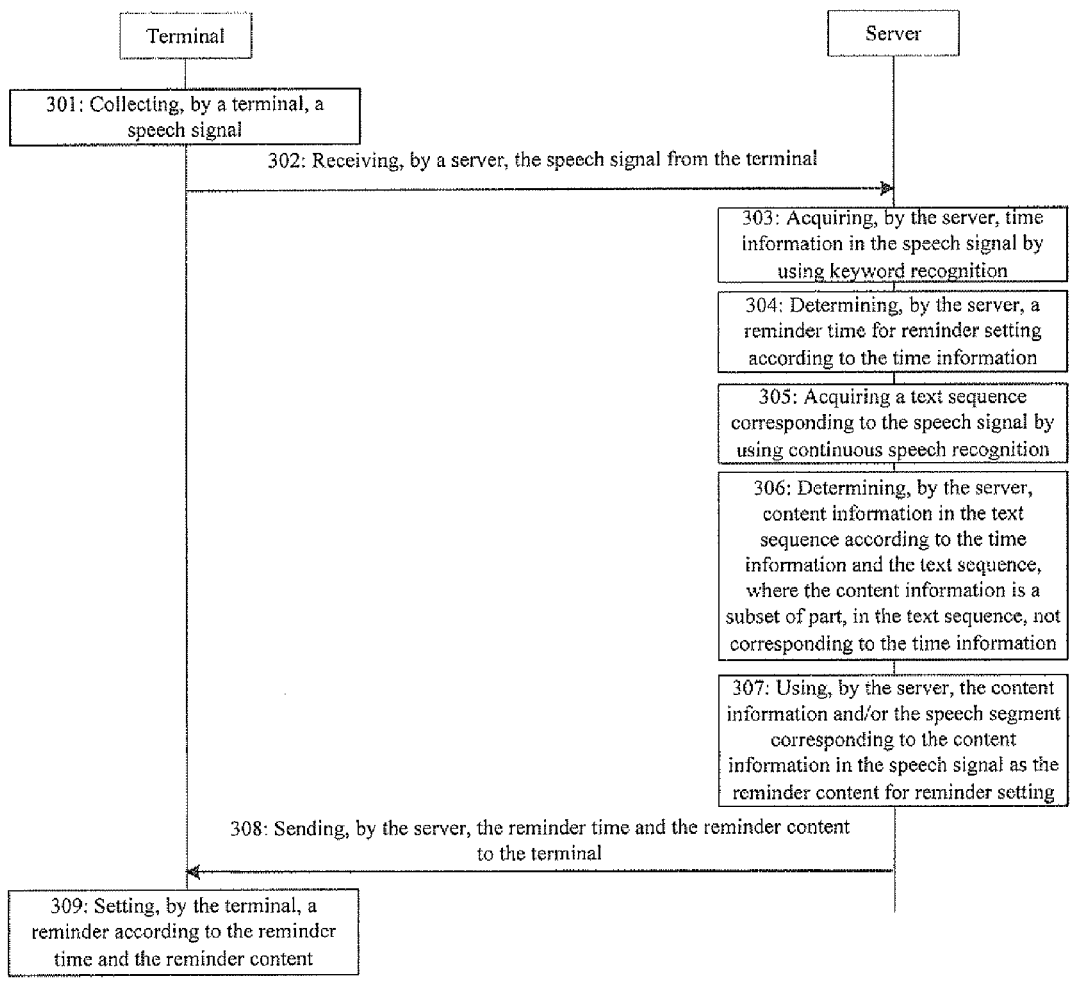
FIG. 3A is a flowchart of a reminder setting method according to still another embodiment of the present invention.

Referring to FIG. 3A, a flowchart of a reminder setting method according to still another embodiment of the present invention is illustrated. Different from the above embodiment, this embodiment uses applying the reminder setting method in an electronic system including at least a terminal and a server as an example for description. The reminder setting method includes:

Step 301: collecting, by a terminal, a speech signal.

Figure 3B:
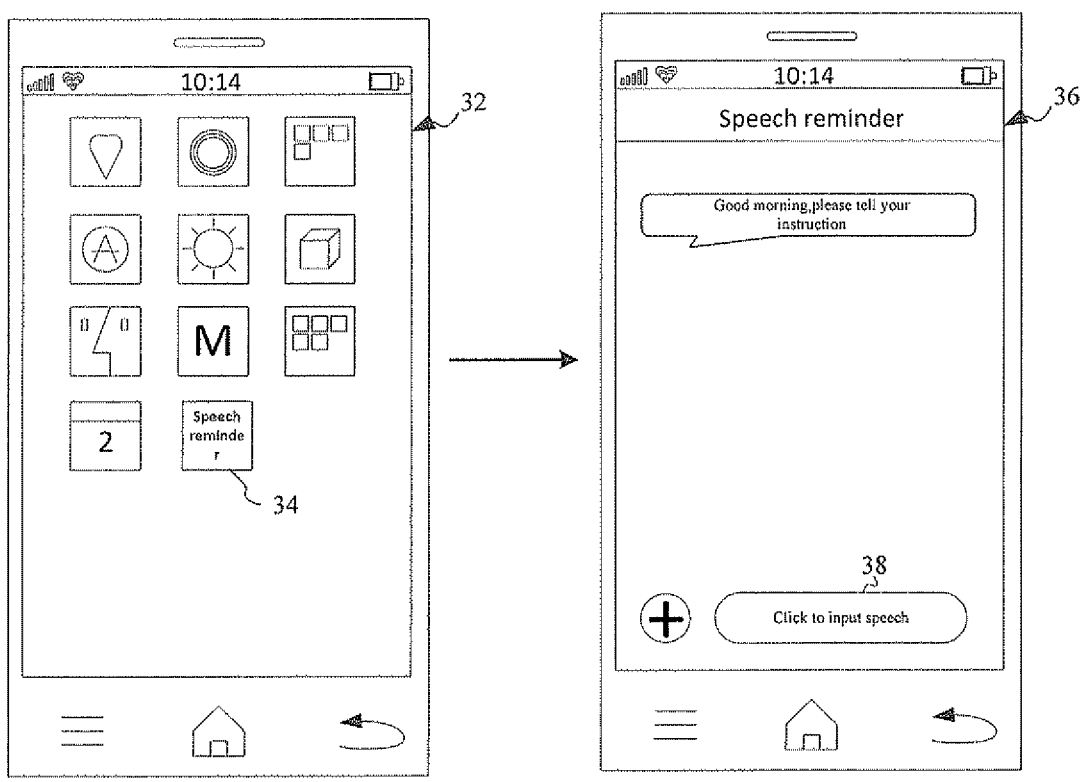
FIG. 3B is a schematic diagram of an interface when a terminal collects a speech signal according to the embodiment illustrated in FIG. 3A

The terminal runs an application program providing the function of setting a reminder based on speech input. With reference to FIG. 3B, the terminal is capable of providing a first interface 32 for enabling setting of a reminder. After a user clicks a "speech reminder" button 34, the interface skips to a second interface 36; and after the user clicks a recording button 38, by using a built-in microphone or an external microphone, the terminal starts collecting the speech signal input by the user. Herein, it is assumed that the speech signal collected by the user is "Please remind me to go for an outing with Jack at 8 o'clock next Wednesday".

Step 302: receiving, by a server, the speech signal from the terminal.

The server is capable of receiving the speech signal from the terminal over a wired network or a wireless network.

Step 303: acquiring, by the server, time information in the speech signal by using keyword recognition.

The server acquires the time information in the speech signal by using keyword recognition, where the time information specifically includes a time-specific keyword, and start and end times of the time-specific keyword in the speech signal. Specifically, the server firstly inputs each of the segments in the speech signal into a keyword search network, where the keyword search network includes at least one foreground model and at least one background model. The time-specific keyword, and the start and end times of the time-specific keyword in the speech signal are acquired by matching the foreground model and the background model with each of the segments respectively. The time-specific keyword, and the start and end times of the time-specific keyword in the speech signal are used as the time information corresponding to the speech signal.

Referring to FIG. 2B, the keyword search network may include M foreground models Keyword (KW), and N background models Filter. The foreground model is used to recognize the time-specific keyword in the speech signal, and the background model is used to recognize the non-time-specific keyword in the speech signal, which facilitates differentiation from the time-specific keyword recognized by the foreground model. To be specific, each foreground model KW may correspond to a time-specific keyword, for example, year, month, day, hour, minute, second, x o'clock, date x, evening, early morning, morning, afternoon, tomorrow, and the like. The background model Filler corresponds to a non-time-specific keyword in the speech signal.

After each of the segments in the speech signal are input into the keyword search network, the segment corresponding to the time-specific keyword is recognized by the foreground model KW, and the segment corresponding to the non-time-specific keyword is recognized by the background model Filler. The non-time-specific keyword recognized by the background model can better differentiate the time-specific keyword recognized by the foreground model. The time-specific keyword in the speech signal, and the start and end times of the time-specific keyword in the speech signal can be acquired by confirming the keyword recognized by the foreground model KW.

The foreground model in the keyword search network may be a single-phone-based or tri-phone-based HMM. The phone is the minimum phonic unit, and the tri-phone is a modeling unit determined according to differences of context of a phone. The training of the foreground model may employ the training procedure of a single-phone-based or a tri-phone-based HMM model. The training process may be as illustrated in FIG. 2C and the above-described embodiment, which is not described any further in this embodiment.

The background model in the keyword search network is not a common model trained by using a non-keyword. In this embodiment, the background model is a model acquired by clustering and subsequently training the phones in the foreground model based on phone confusion; or acquired by training using another language different from the language used by the foreground model. For example, the foreground model is a model acquired by training using Chinese Mandarin, and the background model is a model acquired by training using a language different from Chinese Mandarin but having similarity thereto, for example, Cantonese or Vietnamese. In the foreground and background models, phonic characters of some single phones may be ignored, so that a sharp contrast is formed against the formation of the keyword phone in the foreground model. This prevents as much as possible absorption of a keyword in the speech signal by the background model, and improves retrieval and recall rate of the keyword.

When the background model is acquired by clustering the phones in the foreground model and subsequently training the clustered phones based on phone confusion, the training of the background model is as illustrated in FIG. 2D and the above-described embodiment, which is not described any further in this embodiment.

For example, the server can input the speech signal "Please remind me at 8 o'clock next Wednesday to go for an outing with Jack" into the keyword search network to recognize the time-specific keyword "8 o'clock next Wednesday", and the start and end times of the time-specific keyword "8 o'clock next Wednesday" in the speech signal.

Step 304: determining, by the server, a reminder time for reminder setting according to the time information.

The server may determine, according to the time information acquired by keyword recognition, the reminder time for reminder setting.

Since the recognized time information may be in different formats, this step may further include the following sub-steps:

1) acquiring, by matching, a time information template corresponding to the time information from at least one preset time information template.

The server may match the recognized time information with at least one preset time information template, find a time information template whose time format and sememe are the same as or similar to the time information template, and use this time information template as the time information template corresponding to the time information. In this embodiment, the time information template is searched by using a text corpus containing a large amount of time information. During the search process, all possible text corpuses of the time information are collected first; subsequently sequence characteristics of the text corpuses are analyzed and summarized; and finally the time information template is acquired according to the analysis result. For example, a common time information template is "date+clock", and the time information compliant with the template may be "8 o'clock tomorrow"; another common time information template is "month+date", and the time information compliant with the template may be "April 8".

It should be noted that, although a user may use various different colloquial speeches for the time information during speech input, collecting only time-specific templates consumes a much smaller workload as compared with the case, in the traditional semantic analysis technology, where templates need to be collected for all possible sentences (not limited to time only). In addition, the collected templates can basically cover all colloquial speeches of the users for the time information.

2) converting the time information into a standard time according to a matching result.

The server converts the time information into a standard time according to the matching result. The standard time is typically a time complaint with a specific standard time format. For example, if the standard time format is "year/month/day/hour/minute/second", and the current time is "2013/4/18/10:24:10", the server may convert the time information "8 o'clock next Wednesday" into a standard time "2013/4/24/8:00".

3) using the standard time as the reminder time for reminder setting.

Subsequently, the server uses the standard time as the reminder time for reminder setting, for example, using "2013/4/24/8:00" as the reminder time for reminder setting.

The recognized time information may not be complete sometimes. As a result, a plurality of future times may correspond to the recognized time information. For example, if the speech signal is "Please remind me to attend the meeting at 8 o'clock", the recognized time information is converted to a standard time "xxxx/xx/xx/8:00". In this case, a plurality of future times correspond thereto. Accordingly, this step may specifically include the following sub-steps:

1) The server detects whether there are two or more than two future times matching the standard time.

The server may detect whether there are two or more than two future times matching the standard time. For example, if the standard time is "xxxx/xx/xx/8:00" and the current time is 2013/04/19/07:01:19", then future times "2013/04/19/AM 08:00:00", "2013/04/19/PM 08:00:00", "2013/04/20/AM 08:00:00", and "2013/04/20/PM 08:00:00" match the standard time.

2) if it is detected that there are two or more than two future times matching the standard time, selecting from the two or more than two future times a time satisfying a first preset condition as the reminder time for reminder setting.

The first preset condition may be "closest to the current time". For example, the server may select the time "2013/04/19/AM 08:00", which is closest to the current time from two or more than two future times and use the selected time as the reminder time for reminder setting. In other embodiments, the first preset condition may also be "matching history setting rules more", "corresponding to another speech input by the user" or the like. It should be still noted that there is generally one future time satisfying the first preset condition. However, there may be two or more than two future times satisfying the first preset condition. For example, during setting of a weekly reminder or a yearly reminder, there may be two or more than two future times satisfying the first preset condition.

With the above sub-steps, intelligent adjustment can be performed automatically on the time information when the time information is incomplete. Assuredly, preferably, the server, during adjustment of the time information, may further interact with the user over the terminal, to allow the user to select a more accurate time point from all possible future time points matching the time information.

Step 305: acquiring a text sequence corresponding to the speech signal by using continuous speech recognition.

In addition, the server acquires a text sequence corresponding to the speech signal by using continuous speech recognition. For example, the text sequence corresponding to the speech signal acquired by the server by using continuous speech recognition is "Please remind me to go for an outing with Jack at 8 o'clock next Wednesday".

Specifically, the server firstly loads a search space; extracts audio features from the speech signal; calculates, by Viterbi decoding, an optimal text sequence of the audio features in the search space, where the optimal text sequence includes at least one text, and start and end times of each text in the text sequence; and finally uses the optimal text sequence as the text sequence corresponding to the speech signal. For details, reference may be made to FIG. 2E and the above-described embodiment.

Step 306: determining, by the server, content information in the text sequence according to the time information and the text sequence, where the content information is a subset of part, in the text sequence, not corresponding to the time information.

Specifically, the time information includes a time-specific keyword, and start and end times of the time-specific keyword in the speech signal, the text sequence includes at least one text, and start and end times of each text in the speech signal, and the server partitions, according to the start and end times of the time-specific keyword in the speech signal, and the start and end times of each text in the text sequence in the speech signal, the text sequence into a part corresponding to the time information and a part not corresponding to the time information.

If the part not corresponding to the time information has one section, then the part not corresponding to the time information is used as the reminder content. For example, if the part corresponding to the time information is located in the beginning of the text sequence, then the part not corresponding to the time information has one section and is used as the reminder content.

If the part not corresponding to the time information has two or more than two sections, a section satisfying a second preset condition in the part corresponding to the time information is used as the content information. For example, if the part corresponding to the time information is located in the middle of the text sequence, then the part not corresponding to the time information has two section, and one of the two sections satisfying a second preset condition is used as the content information.

The second preset condition may be "the longest". To be specific, the section satisfying the second preset condition in the part not corresponding to the time information may be a longest section in the part not corresponding to the time information having two or more than two sections.

It should be supplemented that the terms "corresponding" and "not corresponding" herein refer to a relationship in terms of time dimension.

Figure 3C:
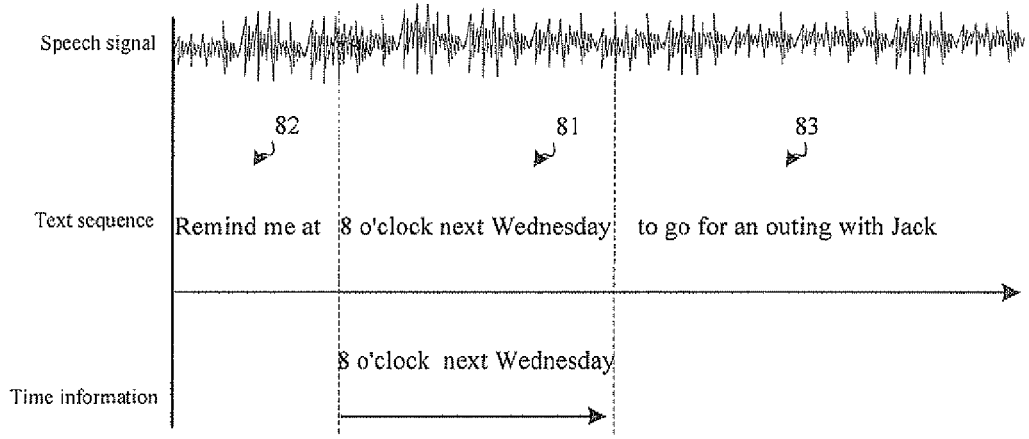
FIG. 3C is a schematic diagram of alignment of results of two paths of speech recognition according to the embodiment illustrated in FIG. 3A.

For example, after acquiring the time information output by keyword recognition and the text sequence output by continuous speech recognition, the server may align the two groups of results, which are illustrated in FIG. 3C. The time information includes the time-specific keyword, and the start time and the end time of the time-specific keyword in the speech signal; the text sequence includes at least one text corresponding to the speech signal and the start time and the end time of each text in the speech signal.

The time information acquired by keyword recognition is "8 o'clock next Wednesday"; whereas the text sequence acquired by continuous speech recognition is "Please remind me to go for an outing with Jack at 8 o'clock next Wednesday". According to the alignment result, the text sequence may be partitioned into a part 81 "8 o'clock next Wednesday" corresponding to the time information, and a part not corresponding to the time information, which includes two sections, a section 82 "Please remind me", and a section 83 "to go for an outing with Jack".

As illustrated in FIG. 3C, the part not corresponding to the time information has two sections. Therefore, the longest section 83 "to go for an outing with Jack" in the part not corresponding to the time information is used as the content information.

Step 307: using, by the server, the content information and/or the speech segment corresponding to the content information in the speech signal as the reminder content for reminder setting.

The server may also use the content information and/or the speech segment corresponding to the content information in the speech signal as the reminder content for reminder setting. The setting includes the following three cases:

The server uses the content information as the reminder content for reminder setting.

The server uses the speech segment corresponding to the content information in the speech signal as the reminder content for reminder setting.

The server uses the content information and/or the speech segment corresponding to the content information in the speech signal as the reminder content for reminder setting.

Step 308: sending, by the server, the reminder time and the reminder content to the terminal.

The server may send the reminder time and the reminder content to the terminal in a format agreed with the terminal.

Step 309: setting, by the terminal, a reminder according to the reminder time and the reminder content.

Figure 3D:
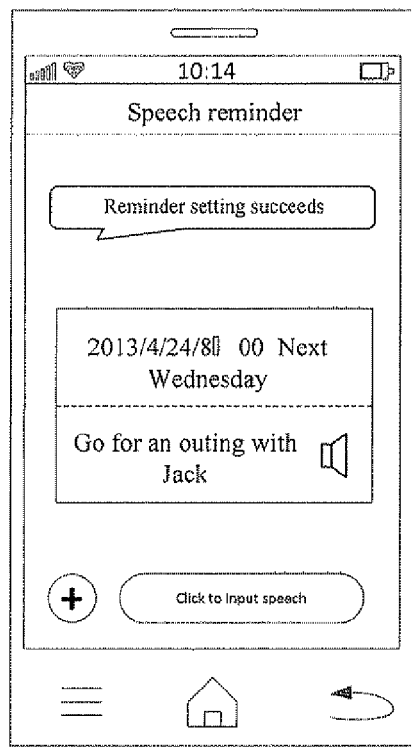
FIG. 3D is a schematic diagram of an interface after the terminal successfully sets a reminder according to the embodiment illustrated in FIG. 3A.

Upon receiving the reminder time point and the reminder content, the terminal sets the reminder according to the reminder time and the reminder content. In addition, the terminal can display the successfully set reminder to users, as illustrated in FIG. 3D.

The reminder content may any or all of the content information and the speech segment corresponding to the content information in the speech signal. Herein, the case where both the content information and the speech segment corresponding to the content information in the speech signal are used as the reminder content for reminder setting is used an example for description. When the reminder time arrives, the terminal may either display on the screen thereof the content information "Please remind me to attend the meeting" in text form, or play over the loudspeaker thereof the speech segment corresponding to the content information in the speech signal "Please remind me to attend the meeting". The non-time information pat is a part of the audio signals in the speech signals input by the user for reminder setting. Assuredly, the terminal may also display, as selected by the user, either the content information or the speech segment corresponding to the content information in the speech signal.

The following describes apparatus embodiments of the present invention. For details that are not described again in the apparatus embodiment, reference may be made to the corresponding method embodiments.

Figure 4:
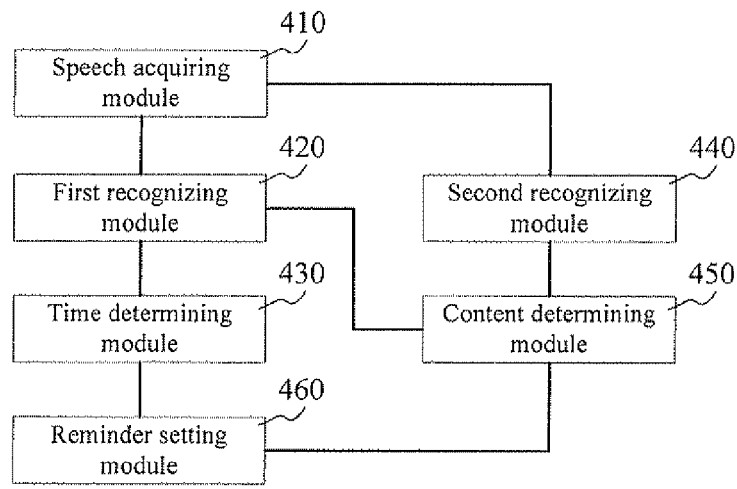
FIG. 4 is a structural block diagram of a reminder setting apparatus according to an embodiment of the present invention.

Referring to FIG. 4, a structural block diagram of a reminder setting apparatus according to an embodiment of the present invention is illustrated. The reminder setting apparatus may be implemented, by software, hardware, or a combination thereof, as all or a part of an electronic device, or as all or a part of a server. The reminder setting apparatus includes: a speech acquiring module 410, a first recognizing module 420, a time determining module 430, a second recognizing module 440, a content determining module 450, and a reminder setting module 460.

The speech acquiring module 410 is configured to acquire a speech signal.

The first recognizing module 420 is configured to acquire, by using keyword recognition, time information in the speech signal acquired by the speech acquiring module 410.

The time determining module 430 is configured to determine a reminder time for reminder setting according to the time information acquired by the first recognizing module 420.

The second recognizing module 440 is configured to acquire, by using continuous speech recognition, a text sequence corresponding to the speech signal acquired by the speech acquiring module 410.

The content determining module 450 is configured to determine reminder content according to the time information acquired by the first recognizing module and the text sequence acquired by the second recognizing module 420.

The reminder setting module 460 is configured to set a reminder according to the reminder time determined by the time determining module 430 and the reminder content determined by the content determining module 450.

In conclusion, according to the reminder setting apparatus provided in this embodiment, acquiring time information in a speech signal by using keyword recognition ensures correctness of time information extraction, prevents the problem that a reminder fails to be set or is set incorrectly because a server incorrectly extracts time information, and achieves an effect that correct time information is still acquired by keyword recognition to set a reminder even in the case that a recognized text sequence is incorrect due to a poor precision in whole text recognition in the speech recognition.

Figure 5:
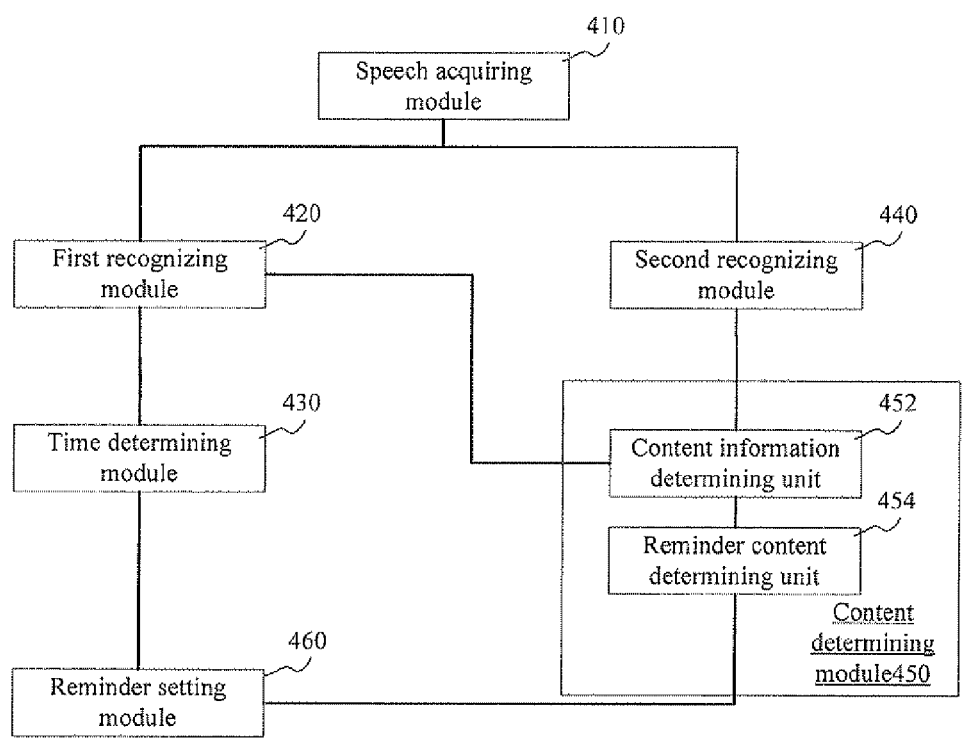
FIG. 5 is a structural block diagram of a reminder setting apparatus according to another embodiment of the present invention.

Referring to FIG. 5, a structural block diagram of a reminder setting apparatus according to an embodiment of the present invention is illustrated. The reminder setting apparatus may be implemented, by software, hardware, or a combination thereof, as all or a part of an electronic device. The reminder setting apparatus includes: a speech acquiring module 410, a first recognizing module 420, a time determining module 430, a second recognizing module 440, a content determining module 450, and a reminder setting module 460.

The speech collecting module 410 is configured to collect a speech signal input by a user.

The first recognizing module 420 is configured to acquire time information in the speech signal collected by the speech collecting module 410.

The time determining module 430 is configured to determine a reminder time for reminder setting according to the time information acquired by the first recognizing module 420.

The second recognizing module 440 is configured to acquire, by using continuous speech recognition, a text sequence corresponding to the speech signal collected by the speech collecting module 410.

The content determining module 450 is configured to determine reminder content according to the time information acquired by the first recognizing module and the text sequence acquired by the second recognizing module 420.

Specifically, the content determining module 450 includes: a content information determining unit 452, and a reminder content determining unit 454.

The content information determining unit 452 is configured to determine content information in the text sequence according to the time information and the text sequence, where the content information is a subset of the part, in the text sequence, not corresponding to the time information.

The reminder content determining unit 454 is configured to use the content information determined by the content information determining unit 452 and/or the speech segment corresponding to the content information in the speech signal as the reminder content for reminder setting.

The time information recognized by the first recognizing module 420 includes a time-specific keyword, and start and end times of the time-specific keyword in the speech signal, and the text sequence acquired by the second recognizing module 440 includes at least one text, and start and end times of each text in the speech signal.

The content information determining unit 452 includes:
a partitioning subunit, a first determining subunit, and a second determining subunit.

The partitioning subunit is configured to partition, according to the start and end times of the time-specific keyword acquired by the first recognizing module 420 in the speech signal, and the start and end times of each text in the text sequence acquired by the second recognizing module 440 in the speech signal, the text sequence into a part corresponding to the time information and a part not corresponding to the time information.

The first determining subunit is configured to, if the part partitioned by the partitioning subunit as not corresponding to the time information has one section, use the part not corresponding to the time information as the content information.

The second determining subunit is configured to, if the part partitioned by the partitioning subunit as not corresponding to the time information has two or more than two sections, use a section satisfying a second preset condition in the part not corresponding to the time information as the content information.

The reminder setting module 460 is configured to set a reminder according to the reminder time determined by the time determining module 430 and the reminder content determined by the content determining module 450.

As compared with the previous embodiment, according to this embodiment, acquiring a background model by clustering and subsequently training phones in the foreground model based on phone confusion, or acquiring a background model by training using another language different from the language used by the foreground model prevents as much as possible absorption of a keyword in the speech signal by the background model, and improves retrieval and recall rate of the keyword.

In addition, by comparison of results of two paths of speech recognition, the content information in a text sequence is used as reminder content for reminder setting, so that even a text sequence acquired by continuous speech recognition is incorrect, reminder setting and running are not affected. In other words, even if the reminder content in this case contains incorrect content information, users will not miss the reminder. Furthermore, when the reminder content includes the speech segment corresponding to the content information in the speech signal, users can still acquire the correct reminder content by using their original speech signal, so that the function of setting a reminder by using speech input has a higher error-tolerance, thereby effectively reducing cases where users can correctly set a reminder only by repeatedly inputting a speech signal.

Figure 6:
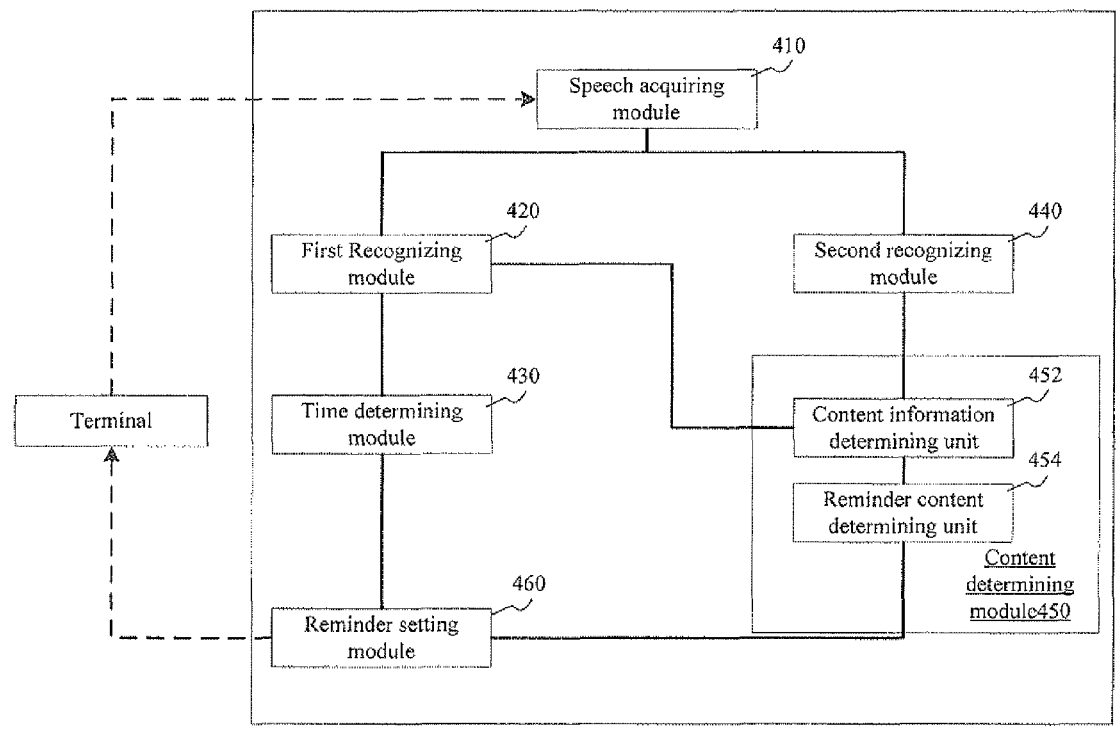
FIG. 6 is a structural block diagram of a reminder setting apparatus according to still another embodiment of the present invention.

Referring to FIG. 6, a structural block diagram of a reminder setting apparatus according to an embodiment of the present invention is illustrated. The reminder setting apparatus may be implemented, by software, hardware, or a combination thereof, as all or a part of a server. The reminder setting apparatus includes: a speech acquiring module 410, a first recognizing module 420, a time determining module 430, a second recognizing module 440, a content determining module 450, and a reminder setting module 460.

The speech acquiring module 410 is configured to receive a speech signal from a terminal.

The first recognizing module 420 is configured to acquire, by using keyword recognition, time information in the speech signal received by the speech acquiring module 410. Specifically, the time information includes a time-specific keyword, and start and end times of the time-specific keyword in the speech signal, and the first recognizing module 420 further includes: an inputting unit and a recognizing unit.

The inputting unit is configured to input each of the segments in the speech signal into a keyword search network, wherein the keyword search network comprises at least one foreground model and at least one background model.

The foreground model is a single-phone-based or tri-phone-based hidden Markov model.

The background model is a model acquired by clustering and training the phones in the foreground model based on phone confusion; or acquired by training using another language different from the language used by the foreground model.

The recognizing unit is configured to match the foreground model and the background model with each of the segments respectively to acquire the time-specific keyword, and the start and end times of the time-specific keyword in the speech signal, and use the time-specific keyword, and the start and end times of the time-specific keyword in the speech signal as the time information corresponding to the speech signal.

The time determining module 430 is configured to determine a reminder time for reminder setting according to the time information acquired by the first recognizing module 420. The time determining module 430 includes: a matching unit, a converting unit, and a time determining unit.

The matching unit is configured to acquire, by matching, a time information template corresponding to the time information from at least one preset time information template.

The converting unit is configured to convert the time information into a standard time according to time information template corresponding to the time information acquired by the matching unit.

The time determining unit is configured to use the standard time converted by the converting unit as the reminder time for reminder setting. The time determining unit includes: a detection subunit and a determining subunit.

The detecting subunit is configured to detect whether there are two or more than two future times matching the standard time.

The determining subunit is configured to, if the detecting subunit has detected that there are two or more than two future times matching the standard time, select from the two or more than two future times a time satisfying a first preset condition as the reminder time for reminder setting.

The second recognizing module 440 is configured to acquire, by using continuous speech recognition, a text sequence corresponding to the speech signal received by the signal receiving module 414. Specifically, the text sequence includes at least one text, and start and end times of each text in the speech signal, and the second recognizing module 440 includes: a loading unit, an extracting unit, and a decoding unit.

The loading unit is configured to load a search space.

The extracting unit is configured to extract audio features from the speech signal.

The decoding unit is configured to: calculate, by Viterbi decoding, an optimal text sequence of the audio features extracted by the extracting unit in the search space loaded by the loading unit, where the optimal text sequence includes at least one text, and start and end times of the each text in the speech signal; and use the optimal text sequence as the text sequence corresponding to the speech signal.

The content determining module 450 is configured to determine reminder content according to the time information acquired by the first recognizing module 420 and the text sequence acquired by the second recognizing module 440.

Specifically, the content determining module 450 includes: a content information determining unit 452, and a reminder content determining unit 454.

The content information determining unit 452 is configured to determine content information in the speech signal according to the time information and the text sequence, where the content information is a subset of the part, in the text sequence, not corresponding to the time information.

The reminder content determining unit 454 is configured to use the content information determined by the content information determining unit 452 and/or the speech segment of the content information in the speech signal as the reminder content for reminder setting.

The content information determining unit 452 includes: a partitioning subunit, a first determining subunit, and a second determining subunit.

The partitioning subunit is configured to partition, according to the start and end times of the time information acquired by the first recognizing module 420 in the speech signal, and the start and end times of each text acquired by the second recognizing module 440 in the speech signal, the text sequence into a part corresponding to the time information and a part not corresponding to the time information.

the first determining subunit is configured to, if the part partitioned by the partitioning subunit as not corresponding to the time information has one section, use the part not corresponding to the time information as the content information.

The second determining subunit is configured to, if the part partitioned by the partitioning subunit as not corresponding to the time information has two or more than two sections, use a section satisfying a second preset condition in the part not corresponding to the time information as the content information.

The reminder setting module 460 is configured to send the reminder time determined by the time determining module 430 and the reminder content determined by the content determining module 450 to the terminal so that the terminal sets a reminder according to the reminder time and the reminder content.

Figure 7:
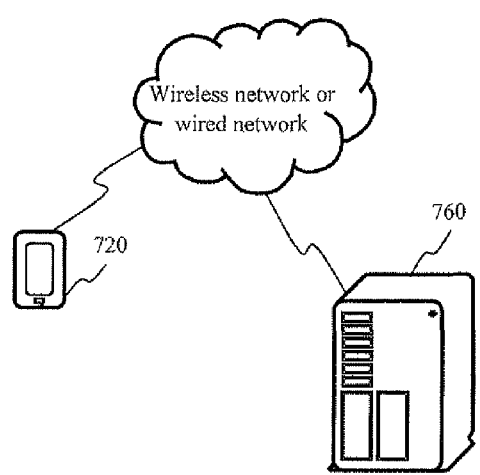
FIG. 7 is a structural block diagram of a reminder setting system according to an embodiment of the present invention.

Referring to FIG. 7, a schematic structural diagram of a reminder setting system according to an embodiment of the present invention is illustrated. The reminder setting system includes a terminal 720 and a server 760.

The terminal 720 may be a smartphone, a tablet computer, an e-book device, an (Moving Picture Experts Group Audio Layer III (MP3) player, a Moving Picture Group Audio Layer IV (MP4) player, a laptop computer, a desktop computer, and the like.

The terminal 720 is connected to the server 760 over a wireless network or a wired network.

The server 760 includes a reminder setting apparatus according to the embodiment illustrated in FIG. 6.

Figure 8:
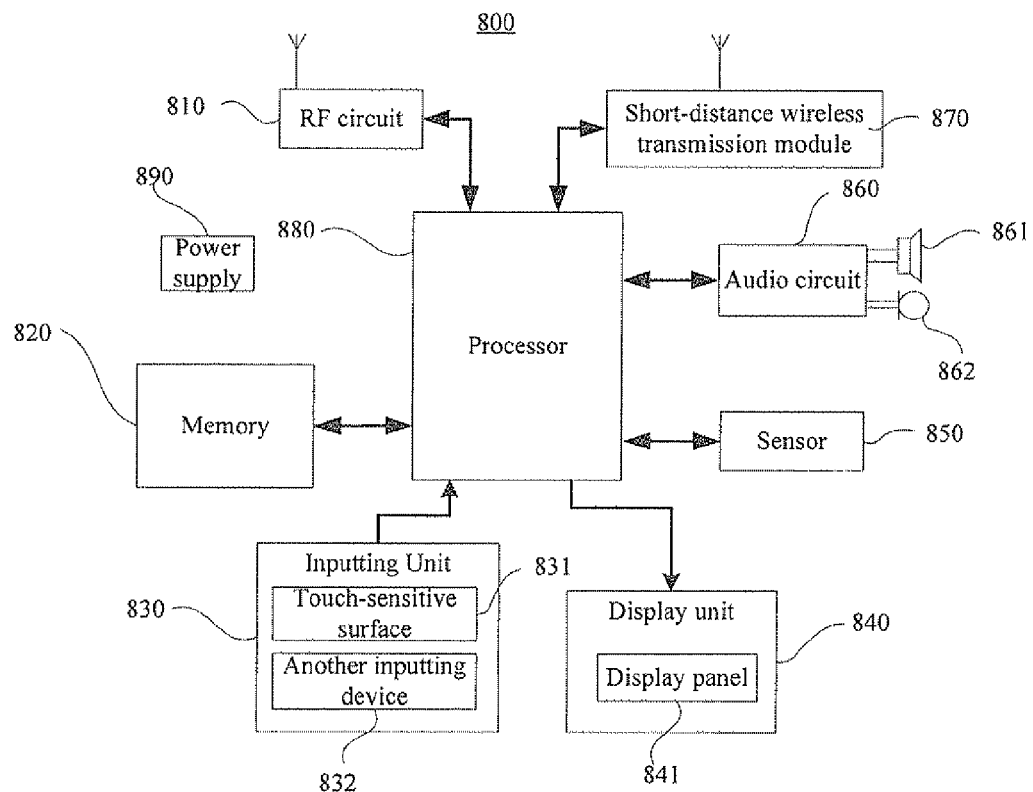
FIG. 8 is a structural block diagram of an electronic device according to an embodiment of the present invention.

Referring to FIG. 8, a schematic structural diagram of an electronic device according to an embodiment of the present invention is illustrated. The electronic device is configured to implement the reminder setting method according to the above-described embodiments.

An electronic device 800 may further includes a radio frequency (RF) circuit 810, at least one memory 820 of a computer readable storage medium, an inputting unit 830, a display unit 840, a sensor 850, an audio circuit 860, a short-distance wireless transmission module 870, at least one processor 880 having a processing core, and a power supply 890. A person skilled in the art can understand that the structure of the electronic device as illustrated in FIG. 8 does not construe a limitation on the electronic device. The electronic device may include more components over those illustrated in FIG. 16, or combinations of some components, or employ different component deployment.

The RF circuit 810 may be configured to receive and send signals during information receiving and sending or in the course of a call. Particularly, the RF circuit delivers downlink information received from a base station to at least one processor 880 for processing, and in addition, sends involved uplink data to the base station. Typically, the RF circuit 810 includes, but not limited to, an antenna, at least one amplifier, a tuner, at least one oscillator, a subscriber identity module (SIM) card, a transceiver, a coupler, a low noise amplifier (LNA), a duplexer, and the like. In addition, the RF circuit 810 may also communicate with another network or device using wireless communication. The wireless communication can use any communication standard or protocol, including but not limited to: global system for mobile communications (GSM), general packet radio service (GPRS), code division multiple access (CDMA), wideband code division multiple access (WCDMA), long term evolution (LTE), email, short messaging service (SMS), and the like.

The memory 820 may be configured to store a software program and a module, for example, a software program for collecting speech signals, a software program for keyword recognition, a software program for continuous speech recognition, and a software program for setting a reminder. The processor 880 performs various function applications and data processing by running the software program and module stored in the memory 820, for example, the function of acquiring speech signals, the function of acquiring time information by keyword recognition, acquiring a text sequence corresponding to the speech signal by continuous speech recognition, and the function of setting a reminder according to this embodiment. The memory 820 mainly includes a program storage partition and a data storage partition. The program storage partition may store an operating system, application program(s) for at least one function (for example, audio playing function, image playing function, and the like). The data storage partition may store data created according to use of the electronic device 800 (for example, audio data, phone book, and the like). In addition, the memory 820 may include a high speed random access memory, or include a non-volatile memory, for example, at least one disk storage device, a flash memory device, or another non-volatile solid storage device. Correspondingly, the memory 820 may also include a memory controller, for providing access to the memory 830 for the processor 880 and the inputting unit 820.

The inputting unit 830 may be configured to receive input numbers and characters, and generate signal input of a keyboard, mouse, operation rod, optical or track ball related to user settings and function control. Specifically, the inputting unit 830 may include a touch-sensitive surface 831 and another inputting device 832. The touch-screen surface 831 is also referred to as a touch screen or a touch control plate, is capable of collecting a touch operation performed by a user thereon or therearound (for example, an operation performed by the user using fingers, touch pens, or other suitable objects or accessories on or around the touch-sensitive surface 831), and drive a corresponding connection apparatus according to a preset program. Alternatively, the touch-sensitive surface 831 may include a touch detecting apparatus and a touch controller. The touch detecting apparatus detects a touch azimuth of the user, detects a signal generated by the touch operation, and transmits the signal to the touch controller. The touch controller receives touch information from the touch detecting apparatus, transforms the information into a touch point coordinate, sends the coordinate to the processor 880, and receives a command issued by the processor 880 and run the command. In addition, resistive, capacitive, infrared, and surface acoustic wave technologies may be used to implement the touch-sensitive surface 831. In addition to the touch-sensitive surface 831, the inputting unit 830 may also include another inputting device 832. Specifically, the another inputting device 832 includes but not limited to one or a plurality of a physical keyboard, a function key (for example, a volume control key, and a switch key), a track ball, a mouse, an operation rod, and the like.

The display unit 840 may be configured to display information input by the user or information provided to the user, and various graphical user interfaces of the electronic device 800. These graphical user interfaces may be formed by graphics, texts, icons, and videos or any combination thereof. The display unit 840 may include a display panel 841. Alternatively, the display panel 841 may be configured by using a liquid crystal display (LCD), an organic light-emitting diode (OLED) or the like. Further, the touch-sensitive surface 831 may cover the display panel 841. When detecting a touch operation thereon on therearound, the touch-sensitive surface 831 transfers the operation to the processor 880 to determine the type of the touch event. Subsequently, the processor 880 provides corresponding visual output on the display panel 841 according to the type of the touch event. In FIG. 8, although the touch-screen surface 831 and the display panel 841 are two independent components to implement input and output functions. However, in some embodiments, the touch-sensitive surface 831 may be integrated with the display panel 841 to implement the input and output functions.

The electronic device 800 may further include at least one sensor 850, for example, a light sensor, a motion sensor, or other type of sensor. Specifically, the optical sensor may include an ambient light sensor and a proximity sensor, where the ambient light sensor is capable of adjusting luminance of the display panel 841 according to the brightness of the ambient light, and the proximity sensor is capable of shutting the display panel 841 and/or backlight when the electronic device 800 is moved close to ears. As a type of motion sensor, a gravity sensor is capable of detecting the acceleration of each direction (typically three axes), and when in the static state, it is capable of detecting the magnitude and direction of the gravity. The gravity sensor may be applicable to an application for recognizing mobile phone gestures (for example, switching between horizontal and vertical screens, and gesture calibration in games and magnetometers), and provides the vibration-based recognition function (for example, pedometers and knocks). The electronic device 800 may also include a gyroscope, a barometer, a hygrometer, a thermometer, and other sensors such as an infrared sensor, which are not described herein any further.

The audio circuit 860, the loudspeaker 861, and the microphone 862 are capable of providing audio interfaces between the user and the electronic device 800. The audio circuit 860 is capable of transmitting an electrical signal acquired by converting the received audio data to the loudspeaker 861. The loudspeaker 861 converts the electrical signal into a voice signal for output. In another aspect, the microphone 862 converts the collected voice signals into the electrical signals, and the audio circuit 860 converts the electrical signals into audio data, and then outputs the audio data to the processor 880 for processing. The processed audio data is transmitted by the RF circuit 810 to another terminal; or the processed audio data is output to the memory 820 for further processing. The audio circuit 860 may further include an earphone plug for providing communication of an external earphone with the electronic device 800.

The short-distance wireless transmission module 870 may be a wireless fidelity (WiFi) module, or a Bluetooth module. By using the short-distance wireless transmission module 870, the electronic device 800 assists users to receive and send emails, brows web pages, and access streaming media, by using the short-distance wireless transmission module 870. The short-distance wireless transmission module 870 provides wireless broadband Internet access services for users. Although FIG. 8 illustrates the short-distance wireless transmission module 870, it can be understood that the WiFi module is not a necessary component for the electronic device 800, and may not be configured as required within the essence and scope of the present invention.

The processor 880 is a control center of the electronic device 800, and connects all parts of a electronic device by using various interfaces and lines, and performs various functions and data processing of the electronic device 800 to globally monitor the electronic device, by running or performing software programs and/or modules stored in the memory 820 and calling data stored in the memory 820. Alternatively, the processor 880 may include one or more processor cores. Preferably, the processor 880 may integrate an application processor and a modem processor, where the application processor is mainly responsible for processing the operating system, user interface, and application program and the like; and the modem processor is mainly responsible for performing wireless communication. It can be understood that the modem processor may also not be integrated in the processor 880.

The electronic device 800 further includes the power supply 890 (for example, a battery) supplying power for all the components. Preferably, the power supply may be logically connected to the processor 880 by using a power management system, so that such functions as charging management, discharging management, and power consumption management can be achieved by using the power supply management system. The power supply 890 may further include at least one DC or AC power supply, a recyclable charging system, a power fault detection circuit, a power adapter or inverter, a power state indicator, and the like.

Although no detail illustration is given, the electronic device 800 may further includes a camera, a Bluetooth module, and the like, which is not described herein any further. In the specific embodiment, the display unit of the electronic device 800 is a touch-screen display.

The electronic device 800 further includes a memory, and at least one program, where the at least one program is stored in the memory and configured to be performed by at least one processor. The one or more than one program includes instructions for performing a reminder setting method. The reminder setting method may be the one illustrated in FIG. 2A and the embodiment corresponding to FIG. 2A.

Figure 9:
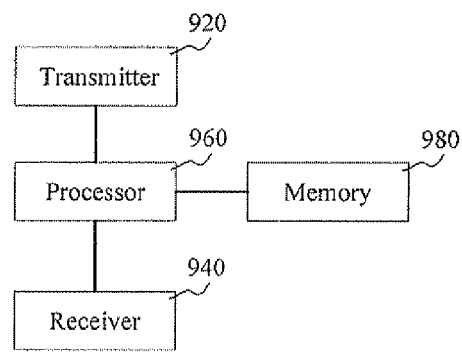
FIG. 9 is a schematic structural diagram of a server according to an embodiment of the present invention.

Referring to FIG. 9, a schematic structural diagram of a server according to an embodiment of the present invention is illustrated. The server may be a server in a reminder setting system, where the reminder setting system further includes a terminal connected to the server over a wireless network or a wired network. The server includes a transmitter 920, a receiver 940, a processor 960, a memory 980, and at least one program, where the at least one program is stored in the memory 980, and is configured to be performed by at least one processor 960. The one or more than one program includes instructions for performing a reminder setting method. The reminder setting method may be the one illustrated in FIG. 3A and the embodiment corresponding to FIG. 3A.

In another aspect, an embodiment of the present invention provides a computer readable storage medium. The computer readable storage medium may be a computer readable storage medium included in the memory described in the above embodiments; or may be an independent computer readable storage medium that is not assembled into an electronic device or a server. The computer readable storage medium stores at least one program, where the at least one program is used by at least one processor to perform a reminder setting method, and the at least one program includes instructions for performing a reminder setting method. The reminder setting method may be the one illustrated in FIG. 2A and the embodiment corresponding to FIG. 2A, and/or the one illustrated in FIG. 3A and the embodiment corresponding to FIG. 3A.

It should be understood that such terms as "first" and "second" used in this application to describe the elements are not intended to limit the elements, but are used for only differentiate the elements. It should also be understood that, in the present application, articles "a", "an" and "the", unless otherwise specified, also denote a plurality. It should also be understood that the term "and/or" in the present application refers to any one or all possible combinations of at least one listed associated item.

The sequence numbers of the preceding embodiments of the present invention are only for ease of description, but do not denote the preference of the embodiments.

A person skilled in the art should understand that all or part steps of the preceding methods may be implemented by hardware or hardware following instructions of programs. The programs may be stored in a computer readable storage medium. The storage medium may be a read only memory, a magnetic disk, or a compact disc-read only memory.

Described above are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A reminder setting method, comprising:
at a computing device having one or more processors, a microphone, a display and memory for storing one or more programs to be executed by the one or more processors:
acquiring a speech signal using the microphone;
extracting, from the speech signal, a plurality of speech segments;
applying the plurality of speech segments to a predefined keyword search network including foreground models and background models, each foreground model configured to recognize a time-specific keyword from a language and each background model configured to a non-time-specific keyword from the language;
acquiring time information in the speech signal when one or more of the plurality of speech segments are identified by the predefined keyword search network as containing a time-specific keyword associated with one of the foreground models, the time information including the time-specific keyword, and start and end times of the identified speech segments in the speech signal, and determining a reminder time for reminder setting according to the time information;
acquiring a text sequence corresponding to the speech signal by using continuous speech recognition, and determining reminder content for reminder setting according to the time information and the text sequence;
setting a reminder according to the reminder time and the reminder content; and
displaying, on the display, the reminder including the reminder time, the reminder content and an option to replay the speech signal.

2. The method according to claim 1, wherein the determining a reminder time for reminder setting according to the time information comprises:
acquiring, by matching, a time information template corresponding to the time information from at least one preset time information template;
converting the time information into a standard time according to the time information template corresponding to the time information; and
using the standard time as the reminder time for reminder setting.

3. The method according to claim 2, wherein the using the standard time as the reminder time for reminder setting comprises:
detecting whether there are two or more than two future times matching the standard time; and;
if it is detected that there are two or more than two future times matching the standard time, selecting from the two or more than two future times a time satisfying a first preset condition as the reminder time for reminder setting.

4. The method according to claim 1, wherein the determining reminder content for reminder setting according to the time information and the text sequence comprises:
determining content information in the text sequence according to the time information and the text sequence, wherein the content information is a subset of the part, in the text sequence, not corresponding to the time information; and
using the content information and/or the speech segment corresponding to the content information in the speech signal as the reminder content for reminder setting.

5. The method according to claim 4, wherein the determining content information in the text sequence according to the time information and the text sequence comprises:
partitioning, according to the start and end times of the time-specific keyword in the speech signal, and the start and end times of the each text in the speech signal, the text sequence into a part corresponding to the time information and a part not corresponding to the time information;
if the part not corresponding to the time information has one section, using the part not corresponding to the time information as the content information; and
if the part not corresponding to the time information has two or more than two sections, using a section satisfying a second preset condition in the part not corresponding to the time information as the content information.

6. The method according to claim 1, wherein:
the foreground model is a single-phone-based or tri-phone-based hidden Markov model; and
the background model is a model acquired by clustering and training the phones in the foreground model based on phone confusion; or acquired by training using another language different from the language used by the foreground model.

7. The method according to claim 1, wherein the text sequence comprises at least one text, and start and end times of the speech segments in the speech signal correspond to the text, and the acquiring a text sequence corresponding to the speech signal by using continuous speech recognition comprises:
loading a search space, the search space including an acoustic model, a lexicon, and a language model;
extracting audio features from the speech signal; and
calculating, by Viterbi decoding, an optimal text sequence of the audio features in the search space, wherein the optimal text sequence comprises the at least one text, and start and end times of the speech segments in the speech signal correspond to the text, and using the optimal text sequence as the text sequence corresponding to the speech signal.

8. A reminder setting apparatus, comprising:
at least a processor, a microphone, a display, and at least a non-transitory computer readable storage medium storing instructions of programs executed by the processor, wherein the programs comprise:
a speech acquiring module, configured to acquire a speech signal using the microphone and extract, from the speech signal, a plurality of speech segments;
a first recognizing module, configured to apply the plurality of speech segments to a predefined keyword search network including foreground models and background models, each foreground model configured to recognize a time-specific keyword from a language and each background model configured to a non-time-specific keyword from the language, and acquire time information in the speech signal acquired by the speech acquiring module when one or more of the plurality of speech segments are identified by the predefined keyword search network as containing a time-specific keyword associated with one of the foreground models, the time information including the time-specific keyword, and start and end times of the identified speech segments in the speech signal;

a time determining module, configured to determine a reminder time for reminder setting according to the time information acquired by the first recognizing module;

a second recognizing module, configured to acquire, by using continuous speech recognition, a text sequence corresponding to the speech signal acquired by the speech acquiring module;

a content determining module, configured to determine reminder content according to the time information acquired by the first recognizing module and the text sequence acquired by the second recognizing module; and a reminder setting module, configured to set a reminder according to the reminder time determined by the time determining module and the reminder content determined by the content determining module and display, on the display, the reminder including the reminder time, the reminder content and an option to replay the speech signal.

9. The apparatus according to claim 8, wherein the time determining module comprises: a matching unit, a converting unit, and a time determining unit; wherein:

the matching unit is configured to acquire, by matching, a time information template corresponding to the time information from at least one preset time information template;

the converting unit is configured to convert the time information into a standard time according to the time information template corresponding to the time information acquired by the matching unit; and the time determining unit is configured to use the standard time converted by the converting unit as the reminder time for reminder setting.

10. The apparatus according to claim 9, wherein the time determining unit comprises:

a detection subunit and a determining subunit; wherein:

the detecting subunit is configured to detect whether there are two or more than two future times matching the standard time; and the determining subunit is configured to: if the detecting subunit has detected that there are two or more than two future times matching the standard time, select from the two or more than two future times a time satisfying a first preset condition as the reminder time for reminder setting.

11. The apparatus according to claim 8, wherein the content determining module comprises: a content information determining unit and a reminder content determining unit; wherein:

the content information determining unit is configured to determine content information in the text sequence according to the time information and the text sequence, wherein the content information is a subset of the part, in the text sequence, not corresponding to the time information; and the reminder content determining unit is configured to use the content information determined by the content information determining unit and/or the speech segment corresponding to the content information in the speech signal as the reminder content for reminder setting.

12. The apparatus according to claim 11, wherein the content information determining unit comprises:

a partitioning subunit, a first determining subunit, and a second determining subunit; wherein:

the partitioning subunit is configured to partition, according to the time-specific keyword acquired by the first recognizing module, and the start and end times of each text in the text sequence acquired by the second recognizing module in the speech signal, the text sequence into a part corresponding to the time information and a part not corresponding to the time information;

the first determining subunit is configured to, if the part partitioned by the partitioning subunit as not corresponding to the time information has one section, use the part not corresponding to the time information as the content information; and the second determining subunit is configured to, if the part partitioned by the partitioning subunit as not corresponding to the time information has two or more than two sections, use a section satisfying a second preset condition in the part not corresponding to the time information as the content information.

13. The apparatus according to claim 8, wherein the foreground model is a single-phone-based or tri-phone-based hidden Markov model; and the background model is a model acquired by clustering and subsequently training the phones in the foreground model based on phone confusion; or acquired by training using another language different from the language used by the foreground model.

14. The apparatus according to claim 8, wherein the text sequence comprises at least one text, and start and end times of the speech segments in the speech signal correspond to the text, and the second recognizing module comprises:

a loading unit, an extracting unit, and a decoding unit; wherein:

the loading unit is configured to load a search space, the search space including an acoustic model, a lexicon, and a language model;

the extracting unit is configured to extract audio features from the speech signal; and the decoding unit is configured to calculate, by Viterbi decoding, an optimal text sequence of the audio features extracted by the extracting unit in the search space loaded by the loading unit, wherein the optimal text sequence comprises the at least one text, and start and end times of the speech segments in the speech signal correspond to the text; and use the optimal text sequence as the text sequence corresponding to the speech signal.

15. A non-transitory computer readable storage medium storing one or more programs in connection with a computing device having at least a processor, a microphone, and a display, which, when executed by the processor, performs the steps of:

acquiring a speech signal using the microphone;

extracting, from the speech signal, a plurality of speech segments;

applying the plurality of speech segments to a predefined keyword search network including foreground models and background models, each foreground model configured to recognize a time-specific keyword from a language and each background model configured to a non-time-specific keyword from the language;

acquiring time information in the speech signal when one or more of the plurality of speech segments are identified by the predefined keyword search network as containing a time-specific keyword associated with one of the foreground models, the time information including the time-specific keyword, and start and end times of the identified speech segments in the speech signal, and determining a reminder time for reminder setting according to the time information;
acquiring a text sequence corresponding to the speech signal by using continuous speech recognition, and determining reminder content for reminder setting according to the time information and the text sequence;
setting a reminder according to the reminder time and the reminder content; and
displaying, on the display, the reminder including the reminder time, the reminder content and an option to replay the speech signal.

* * * * *